United States Patent [19]

Perry

[11] 3,757,299

[45] Sept. 4, 1973

[54] METHOD AND APPARATUS FOR MEASURING THE SIZE OF ZONES OF INHIBITION IN AN ASSAY MEDIUM

[75] Inventor: Russell C. Perry, Smithtown, N.Y.

[73] Assignee: Artek Systems Corp., Farmingdale, N.Y.

[22] Filed: July 14, 1972

[21] Appl. No.: 271,987

[52] U.S. Cl. 340/146.3 AC, 340/146.3 Y, 235/92 PC

[51] Int. Cl. ........................ G06m 11/04, G06r 9/12

[58] Field of Search ........... 340/146.3 AC, 146.3 Y; 235/92 PC; 356/102; 324/71 CP; 250/222 M

[56] References Cited

UNITED STATES PATENTS

| | | | |
|---|---|---|---|
| 2,803,406 | 8/1957 | Nuttall | 340/146.3 Y |
| 3,214,574 | 10/1965 | Landsman et al. | 340/146.3 Y |
| 3,315,229 | 4/1967 | Smithline | 235/92 PC |
| 3,349,227 | 10/1967 | Martens et al. | 235/92 PC |
| 3,593,283 | 7/1971 | Miyamoto et al. | 340/146.3 Y |
| 3,611,267 | 10/1971 | Edling | 340/146.3 Y |

*Primary Examiner*—Thomas A. Robinson
*Attorney*—Leonard H. King

[57] ABSTRACT

A pattern recognition and measuring system for zones of inhibition in a biological assay medium which scans and digitally quantizes the entire medium into pulses representing the zone area. A specific zone is selected and the number of pulses representing the zone selected are counted. In one embodiment the medium is divided into sectors and the pulses per sector are counted. In a second embodiment the longest horizontal chord perpendicularly crossing a vertical line through the center of the zone selected is determined as the diameter. In a third embodiment a horizontal chord through the presumed center of the zone selected is perpendicularly bisected and the perpendicular further bisected to locate the actual zone center. In a last embodiment a generated geometric shape is incrementally expanded at the presumed center until it intersects the perimeter of the zone selected. The presumed center is then shifted in accordance with the location of the intersection to locate the actual center. The geometric shape is again concentrically changed in size by increments until a predetermined number of coincident points occur with the zone perimeter.

18 Claims, 28 Drawing Figures

FIG. 1
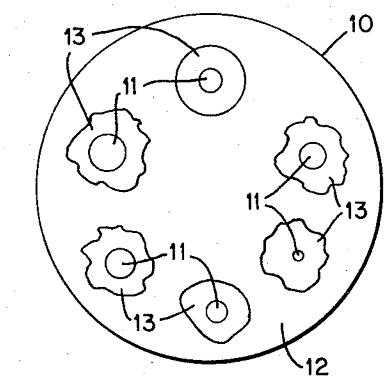
FIG. 2
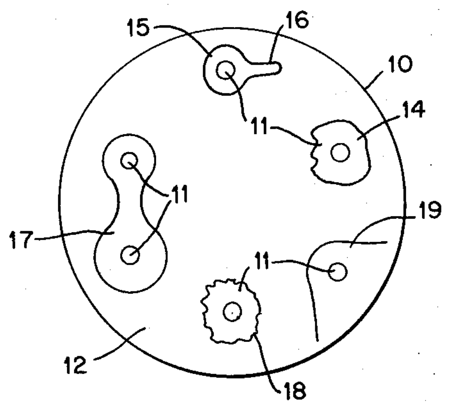
FIG. 3
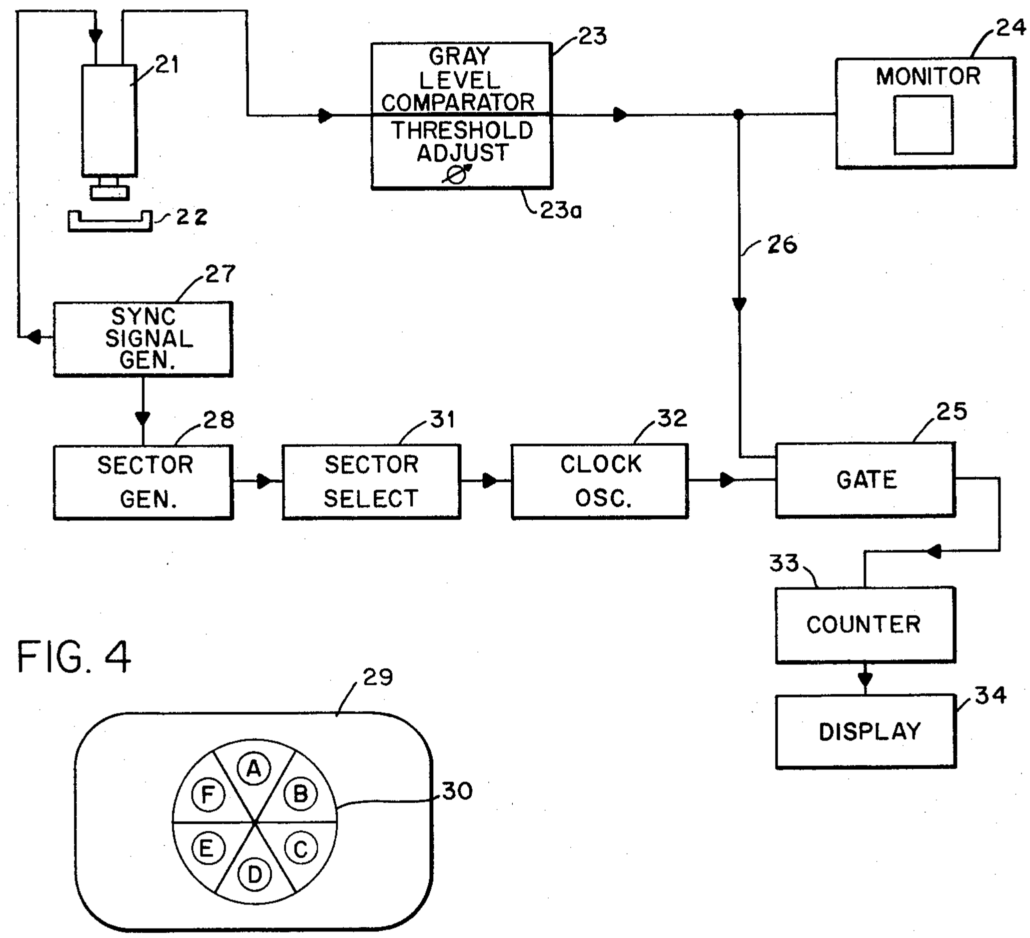
FIG. 3, FIG. 4

| QUAD-RANT | ΔX | ΔY |
|---|---|---|
| I | −1 | +1 |
| II | −1 | −1 |
| III | +1 | − |
| IV | +1 | +1 |
| I & II | −1 | 0 |
| II & III | 0 | −1 |
| III & IV | +1 | 0 |
| IV & I | 0 | +1 |

METHOD AND APPARATUS FOR MEASURING THE SIZE OF ZONES OF INHIBITION IN AN ASSAY MEDIUM

This disclosure relates generally to measuring the properties of irregularly shaped patterns using an electronic scanning system, and more particularly to a method and apparatus for the measurement of antibiotic zones of inhibition in which the digitized output of the zone is selected and counted.

BACKGROUND OF THE INVENTION

Pattern recognition systems are well known and are generally available for numerous types of application. Specifically, scanning systems can be used for the determination of the size of an object, the location of objects in a field, the dimension of various patterns for many other types of measurement requirements. One particular area in which little work has been done is with regard to the automation of microbiological diffusion assays. Typically, an agar medium is innoculated with an appropriate assay organism and antibiotics are allowed to diffuse into the agar medium by means of absorbent discs located on the agar medium or small cylinders placed on the agar medium. After incubation, zones of inhibition are seen around the reservoir of antibiotics, the dimensions of the zones being a function of the effectiveness of the antibiotic against the assay organism. The key to such microbiological diffusion assays is the measurement and comparison of the zones of inhibition. While such zones can be measured and compared manually, the true advantages of such antibiotic sensitivity measurement lies in its speed and accuracy of measurement. Thus, automatic scanning means are a definite necessity for effective use of this diagnostic tool.

While some of the state of the art pattern recognition systems might lend themselves for use in an antibiotic sensitivity measurement system, because of the unique characteristics of such systems, special methods and apparatus would appear to be more beneficial for automatic scanning and reading of antibiotic sensitivity systems rather than the available known equipment. Generally, when the reservoirs of antibiotics are placed on the agar medium they are located at presumed predetermined locations on the medium. While these locations may drift in actuality from the predetermined and selected positions, they are still generally positioned within a predetermined part of the agar medium. Also, in reading out the size of the zone of inhibition, it is required that each zone be able to be identified individually and measured independently of all other zones. As a result, special methods and apparatus are useful for effectively automating the scanning and measuring of zones in an antibiotic sensitivity system.

Accordingly, it is an object of this invention to provide automatic scanning and measuring of patterns located on a medium.

A further object of the invention is to provide a method and apparatus for measuring zones of inhibition located within the proximity of a predetermined location on an agar medium.

Yet a further object of the invention is to provide a pattern recognition system for determining the area and diameter of generally circular patterns located on a medium.

Still a further object of the invention is to provide a pattern recognition system using a scanning device to convert optical density into electrical signals and calculating area and diameter from such electrical signals.

Another object of the invention is to provide a pattern recognition system for measuring the area of predetermined zones of inhibition located within given sectors of a medium.

A further object of the invention is to provide a pattern recognition and measuring system which determines the diameter of a proximate circular zone by calculating the longest chord crossing a presumed diameter.

Yet another object of the invention is to provide a pattern recognition and measuring system for locating a specified pattern from a medium and determining the diameter of the pattern by locating the true center of the pattern from a presumed pattern center and determining the diameter from the true pattern center.

Yet another object of the invention is to provide a pattern recognition and area measuring system for generating a geometric shape and expanding the geometric shape concentrically until the number of intercepts equal one-quarter of the radius number generated between the geometric shape and the perimeter of the pattern to be measured.

A further object of the invention is to provide a pattern recognition and measuring system for determining the area of a given pattern by generating a geometric shape around a presumed centroid and expanding it concentrically until it intersects the perimeter of the pattern and thereby initially determining the actual center of the pattern from the location of the intersection and further generating the geometric shape around the actual center and expanding it concentrically until a given number of intersections occur between the expanding geometric shape and the perimeter of the pattern.

These and other objects of the invention will become more apparent from the following description taken in conjunction with the figures hereinafter to be described.

BRIEF DESCRIPTION OF THE INVENTION

This invention provides a pattern recognition and automatic measuring system for reading and measuring patterns and specifically zones of inhibition on a background of typically an agar medium. A scanning device, for example a TV camera or flying spot scanner, is used to convert optical density or reflectivity variations in the medium into an amplitude modulated electrical signal. Because the patterns, or zones of inhibition are located in proximity to predetermined specific locations, and are of generally circular shape, the system of the present invention uses the predetermined locations in selectively reading the area or diameter of the particular zones to provide a more efficient and quicker measurement system for such zones.

In one embodiment, the area of the zone per sector of the medium is measured. In a second embodiment, the longest chord perpendicularly intersecting a presumed diameter generated from the presumed center of the approximate circular zone is used as the dimension of the true diameter to determine the area. In yet a further embodiment, the actual center is located by generating a chord passing through the presumed center; bisecting the chord perpendicularly and further bisecting the perpendicular, to locate the actual center. The diameter of the zone is then measured from the actual center. The area is then calculated from the measured diameter.

Yet another embodiment is presented wherein a geometric shape is concentrically expanded or contracted in steps using the presumed center until one of the geometric shapes intersects the perimeter of the zone to be measured by a predetermined number of intersections. In a refinement of the last mentioned embodiment, the changing geometric shapes can be first used to locate the actual center from the presumed center. Such actual center is located by expanding the geometric shape from the presumed center by shifting the center position in a direction opposite to the point of intersection. Once the actual center is located, the changing geometric shapes are then generated from the actual center to determine the area of the zone in accordance with the last mentioned embodiment.

BRIEF DESCRIPTION OF THE FIGURES OF DRAWING

In the figures of the drawing, like reference characters designate like parts.

FIG. 1 is a typical medium containing zones upon which the system of the present invention is to operate;

FIG. 2 shows a further medium with unique variations in the zones upon which the present system is to operate;

FIG. 3 shows a block diagram of a first embodiment of the present invention;

FIG. 4 shows a raster scan picture useful in explanation of the embodiment shown in FIG. 3;

DETAILED DESCRIPTION OF THE INVENTION

Figure 5:
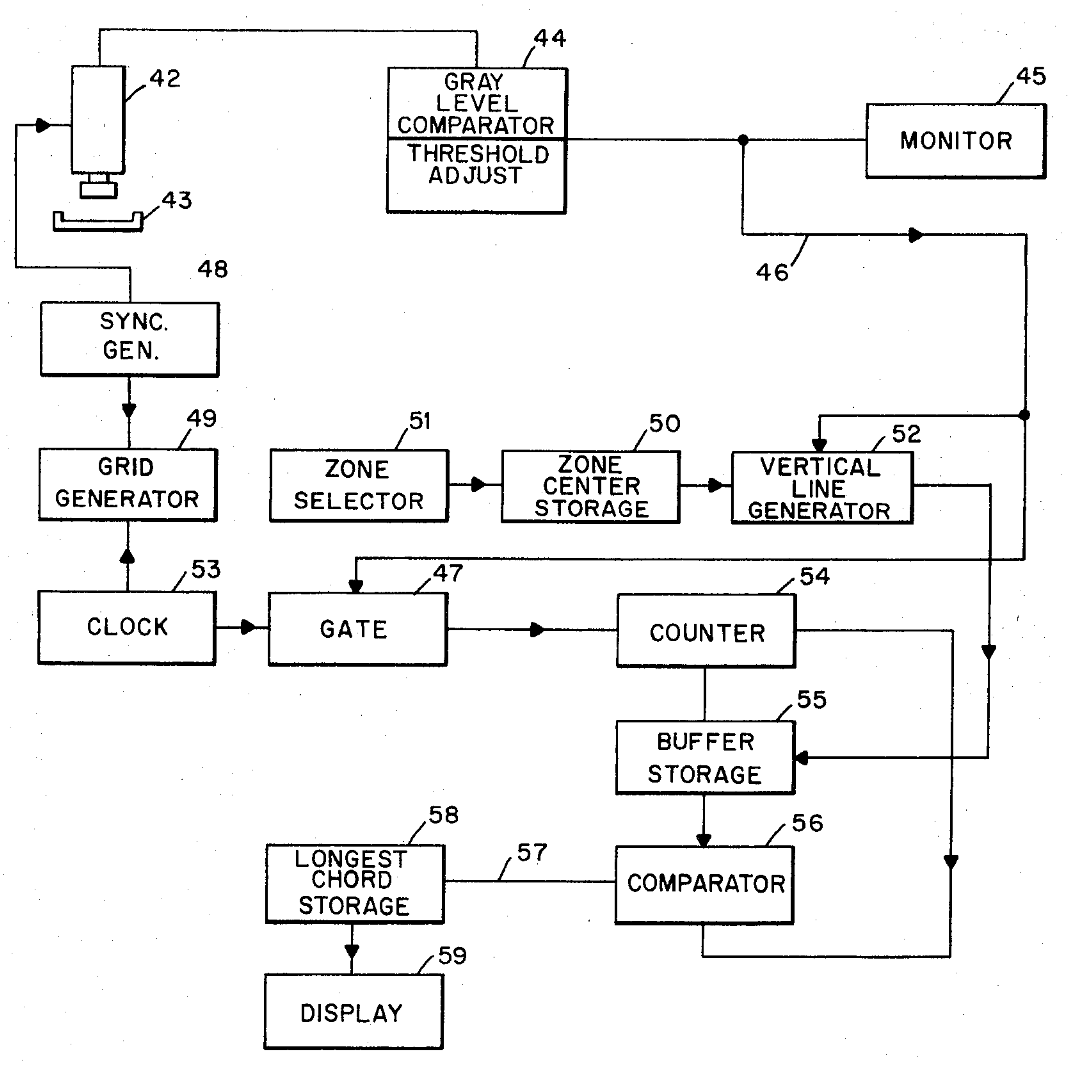
FIG. 5 shows a block diagram of a second embodiment of this invention.

Referring now to FIG. 1 there is shown a typical medium to which the present invention is applied. Specifically, a culture dish 10 is shown having a plurality of discs 11 each saturated with an antibiotic concentration and located upon an agar medium 12 innoculated with appropriate assay organisms. After an incubation period, each of the discs 11 is surrounded by a zone of inhibition 13, each zone being of approximate circular shape. However, as can be seen, the perimeter of the zones is not a fixed radial path from the center and generally follows an irregular shape. As is well known in the art, the agar medium innoculated with the assay organism is generally of a dark color, typically black, while the zones of inhibition are of a contrasting color, typically white, thereby facilitating differentiation between the inhibition zone and the assay organism. Furthermore, as is known in the art, instead of using the saturated discs, other means of providing a reservoir of antibiotic material on to the agar medium are available. However, regardless of the method used to provide the antibiotic reservoir, the location of the antibiotic and, consequently, the approximate locations of the zones of inhibition surrounding such antibiotic reservoirs are proximate to predetermined fixed locations. In most cases, the approximate center of the disc or reservoir of antibiotic material is generally known prior to placement upon the agar medium. By measuring the area of the zone of inhibition, the effectiveness of the particular antibiotic concentration can be determined. Such area can be determined by actual area measurement or by diameter measurement and then presuming an approximate circular shape, the area can then be calculated.

In automating the area measurement of the microbiological culture assay, typically shown in FIG. 1, it is necessary to determine the area measurement of each of the zones of inhibition and to correspond the particular area measured with the identity of the zone being measured.

While theoretically the zones of inhibition are approximately circular zones, in practice such zones are frequently of unusual shape. As shown in FIG. 2, wherein an agar medium 2 has been placed on a culture dish 10 and innoculated with the microbiological assay organism and subsequently discs 11 saturated with antibiotic concentrations have been placed upon the agar medium 12. The zones of inhibition resulting from peculiar shapes. Zone 14 has the proximate circular shape previously discussed. However, zone 15 is shown having a finger-like beak 16 protruding at one portion of the otherwise generally circular shape. In measuring the diameter, should the measurements occur at the point of the protrusion, the measurement would be misleading and the area calculated from the measured diameter would be erroneous.

Zone 17 is shown in a condition commonly called "twinning." Effectively, two zones have grown into each other forming a figure eight like zone of inhibition. The zone of inhibition 18 surrounding the disc 11 while having a proximate circular shape has broken edges in the perimeter providing blurred sections which would not permit accurate measurement of the area using perimeter intersection methods. The final zone 19 is shown having grown so large as to run out beyond the edge of the culture dish. Again, misleading and erroneous results would be had using most pattern recognition measuring schemes.

While the general systems and methods hereinafter discussed for measuring the zones of inhibition will be geared to the general shape shown in FIG. 1, it is understood that these methods will be able to handle the particular unusual patterns generated by the zones as shown in FIG. 2.

Referring now to FIG. 3 there is shown a block diagram of a first embodiment for carrying out the method of this invention referred to as the "area method." FIG. 3 shows a standard television camera 21 scanning a series of zones contained within a dish shown at 22. While a typical standard 525 line television camera is intended, it is understood that a flying spot scanner or other scanning devices known in the art could similarly be used for the same purpose. The video signal from the scanning device 21 passes through a gray level comparator 23 which can be set by a threshhold adjust control shown at 23a to provide a two-level signal representing the black and white picture which can be viewed on the monitor at 24 wherein one level represents the presence of the zone and the other level represents the surrounding area. The output from the comparator 23 also enters into gate 25 along line 26. The scanning device 21 is synchronized both vertically and horizontally by a synchronizing signal generator 27 as is generally known in the art. The synchronizing signal generator 27 also provides the necessary pulses to a sector generator 28. Referring to FIG. 4, there is shown a typical scanned pattern 29 which would be viewed on monitor 24 showing the particular dish 30. The dish 30 is shown divided up into six pie-shaped sectors labeled sequentially A through F. The number of sectors is typically selected to equal the number of discs placed upon the dish such that only one disc is located within each sector. Since the placement of the discs or antibiotic reservoirs on the agar medium within the dish is at a predetermined spatial location around the agar medium, the sector location and selection can easily be determined. The synchronizing signal generator 27 which generates the pulses for scanning sends these pulses into the sector generator 28 such that as the scanning pulses pass from one sector to another sector, the sector generator monitors the progress and retains the information as to which sector the camera 21 is scanning. Thus, for example, as the camera 21 is scanning across the upper half of the dish from left to right, the pulses will cross sector F, then sector A and then sector B. Sector generator 28 has the necessary circuitry to divide the field into the pie-shaped segments shown in FIG. 4 and retains the information as to which sector is being scanned.

Sector selector 31, connected to the output of the sector generator 28, allows for the selection of a particular sector whose zone of inhibition contained therein is to be measured. The information concerning the selected sector is then passed through the gate 25 by means of the clock oscillator 32 which opens the gate for the scanning pulses in the sector selected while closing the gate for the other sectors. The resulting pulses are accumulated by the counter 33 and may also be displayed at the readout display 34.

Thus, as the scanning camera 21 scans across the dish, the information is sent along line 26 to one input of the gate 25. If, for example, the sector selector 31 is set to provide information from sector A (FIG. 4), as the synchronizing signal generator provides the pulses for scanning, the sector generator will select those pulses relating sector A and clock them through the gate 25 by means of clock generator 32. The only information from line 26 which will, therefore, pass through gate 25 will be those clocked therethrough relating to the information from sector A. The counter 33 will then count those pulses providing a white area contained in sector A which effectively represents the total area of the particular zone of inhibition in sector A.

By appropriate selection of the oscillator frequency, the counter can be made to read out directly in area units, for example, square millimeters or square centimeters, etc. After the area of the zone is thus compiled, the diameter of the zone can be determined by calculation either by machine or by subsequent computer operation.

While the method shown by the apparatus of FIG. 3 may provide a practical and simple readout measurement, it assumes that the zone remains within its particular sector without spreading and also is limited in spacing to having one zone in each sector. Thus, zones could not be placed radially in the dish but only circumferentially. Furthermore, should other light areas be present within the sector not generated by a zone of inhibition but through noise or physical disturbances, such white areas would be included in the measurement as presumably part of the zone and will introduce erroneous measurements.

A second embodiment of the present invention which avoids some of the problems of the first embodiment is shown in FIG. 5 and is referred to as "the longest chord" method. In order to understand the operation of FIG. 5 reference is first had to FIGS. 6 and 7.

Figure 6:
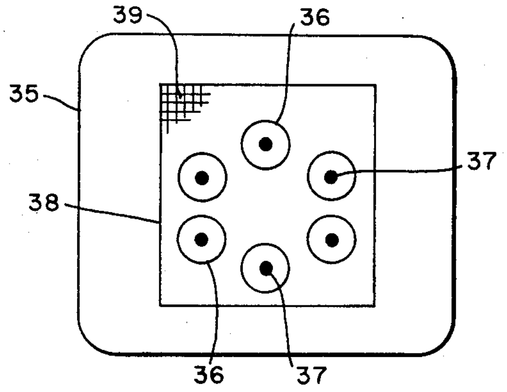
FIG. 6 shows a raster scan picture useful in explanation of the operation of the embodiment of FIG. 5.

In FIG. 6 there is shown the entire field scanned by the camera shown generally at 35 with the zones of inhibition 36 surrounding a series of discs 37. A rectangular grid coordinate system contained within an area 38 has narrowly spaced vertical and horizontal lines, approximately 100 by 100, some of which are shown in the upper corner 39. It is understood that the grid lines, however, cover the entire area within 38. The horizontal grid lines are the raster lines produced by the television camera while the vertical lines are produced by an oscillator contained in a grid generator to be hereinafter described.

Figure 7:
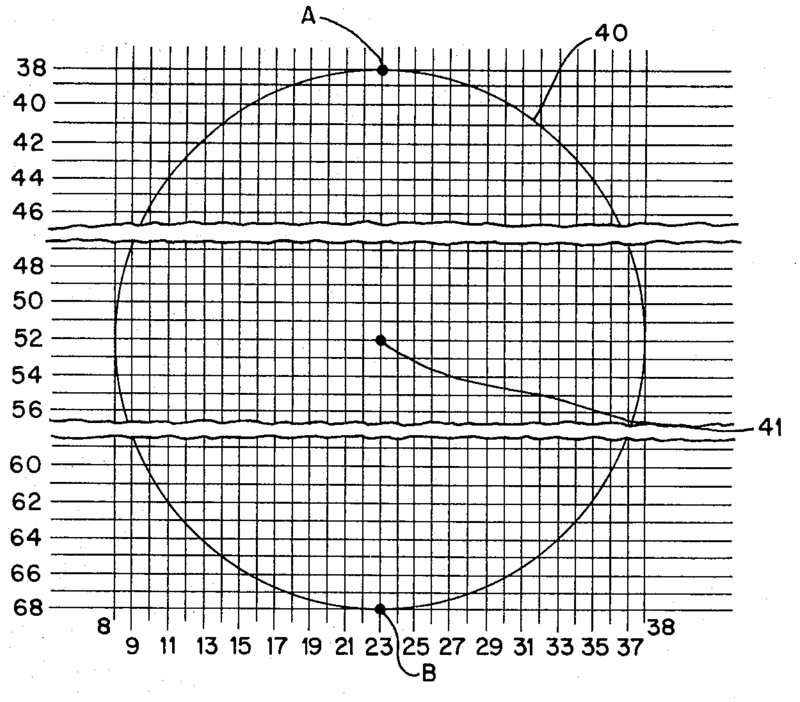
FIG. 7 shows a grid system generated in conjunction with the operation of the system shown in FIG. 5.

FIG. 7 shows one of the six zones of inhibition of FIG. 6 whose perimeter 40 is shown to be circular. It is understood, however, as heretofore explained that the perimeter will not be an exact circular line but is merely shown as such for ease of explanation. The grid shown and discussed in connection with FIG. 6, is herein also shown superimposed on the zone and is numbered such that the horizontal elements extend from $y=38$ to $y=68$, while the vertical elements are shown extending from $x=8$ to $x=38$. When the discs are placed on the agar medium, the presumed center of the discs are known. In the zone shown in FIG. 7, the presumed center 41 is located at $x=23$, $y=52$. A line A-B is generated, which passes through the presumed zone center and terminates at the zone edges. Although this line itself would be thought of as being the zone diameter, since the points A and B may not be accurately placed on the zone edges due to discontinuities in the digitized picture information, or due to an irregularly shaped perimeter, a further diameter is measured. Furthermore, the presumed center at 41 may not be the actual center of the zone since in the placement of the disc it may have shifted slightly from its presumed center, or the zone may not be concentric with the disc centroid.

Accordingly, the zone is scanned with horizontal scanning pulses and for each horizontal scan line, the number of pulses within the zone is counted. For example, for the line $y=38$, zero pulses would be counted. For the line $y=40$, 14 pulses would be counted extending from $x=14$ to $x=27$. At the line $y=42$, 20 pulses would be counted extending from $x=13$ to $x=33$. Each time a new count is presented, the count is compared with the previous count and the larger of the count numbers is retained in a storage unit. For FIG. 7 the following succession of numbers would be obtained:

| Line No. | Number of pulses |
|---|---|
| 38 | 0 |
| 40 | 14 |
| 42 | 20 |
| 44 | 24 |
| 46 | 26 |
| 48 | 28 |
| 50 | 29 |
| 52 | 30 |
| 54 | 29 |
| 56 | 29 |
| 58 | 28 |
| 60 | 26 |
| 62 | 24 |
| 64 | 21 |
| 66 | 15 |
| 68 | 0 |

The longest of these lines located at $y=50$ would produce a total of 30 pulses which would represent the best approximation to the zone diameter.

This method described can be carried out by the apparatus shown in FIG. 5, wherein a camera 42 scans a medium contained in a dish 43. The output from the camera 42 is sent to gray level comparator 44 whose digitized output can be viewed on monitor 45. The information from comparator 44 also sent on line 46 to gate 47. The horizontal and vertical scanning information for the camera 42 is provided by the synchronizing generator 48. A grid generator 49 receives signals from the synchronizing generator 48 and generates a rectangular grid coordinate system which is superimposed on the camera field as previously described and shown with regard to FIGS. 6 and 7. The horizontal grid lines ($y$ lines) are the raster lines produced by the camera. The vertical lines ($x$ lines) are produced by an oscillator contained within the grid generator 49.

The coordinates of the presumed centers of the disc, and therefore the presumed centers of the zones, are contained in storage element 50 whose control is by zone selector 51 whereby the storage 50 produces a pair of previously stored x and y coordinates representing the center of the zone selected by selector 51. The center coordinates are used by vertical line generator 52 to produce a vertical line passing through the center coordinates and extending until it intersects the perimeter of the zone. The information concerning the zone perimeter is obtained from the gray level comparator 44 which is fed into the vertical line generator 52. The vertical output is sent to a storage 55 which contains the horizontal pulses and the vertical line insures that the horizontal pulses being measured are those directly related to the particular zone selected.

The perimeter of the zone selected is identified by the information digitized by the gray level comparator element 44. Typically, the signal within the zone perimeter is designated "true." The vertical line generator 52 uses the "true" information from the comparator 44 to produce the particular vertical line passing through the zone center and terminating at the zone perimeter. This line is shown in FIG. 7 as line AB.

The clock shown at 53 produces a pulse train which passes through the gate 47 only during the time that the "true" or zone level exists at the output of the gray level detector. The pulses are accumulated by the counter 54 which is reset to zero at the beginning of each horizontal grid line passing through the zone area. Thus, each time a horizontal scan line crosses the perimeter into the zone of inhibition the counter is reset to zero and the number of pulses clocked through the gate 47 represents the number of pulses of "true" scan line within the zone of inhibition which is then counted in counter 54. As the horizontal scan line ends the "true" information, indicating that it has again crossed the perimeter of the zone of inhibition, this time leaving it, the counter will no longer count any pulses and will retain the count until the scan line again crosses into the area enclosed by the perimeter on the next horizontal line. Thus, for each horizontal scan line the counter 54 contains a number of pulses which represents a chord of the zone. The storage element 55 stores the value found by the counter 54 at the end of each horizontal scan line. Since the vertical line generated by vertical line generator 52 also enters the storage element 55, this insures the fact that the storage 55 will only retain information relating to those chords actually crossing the vertical line of the zone. This will allow discrimination of the particular zone selected from all other zones which may be along the same horizontal scan line but possibly at the opposite side of the agar medium. In this manner, a particular zone can be selected independently of all others for area measurement.

The comparator 56 compares the number in counter 54 at the end of a particular scan line, with the number stored in the storage element 55. The output on line 57 from the comparator 56 represents the larger of the two numbers, which is sent to the storage 58 which stores the longest chord number. This number will be displayed at the output 59.

In summary, this embodiment provides the following sequences of operations. Firstly, a vertical line is generated at the presumed center of the zone selected; the vertical line terminating at the top and bottom edges of the zone itself. Each chord which intersects the vertical line is counted and compared in length to the preceding chord. The longer of the two chords is stored in the longest chord storage element. Once the diameter, represented by the longest chord, has been determined, the area of the zone of inhibition can be calculated automatically therefrom or determined manually, presuming a proximate circular shape for the zone of inhibition.

Although the embodiment of FIG. 5 is generally useful for most applications, since it is based upon the calculation of the diameter rather than the direct computation of the area, the possibility exists that the longest chord, which is presumed to be the diameter, may occur at a point of unusual expansion, such as a finger-like protrusion, which will result in erroneous measurements. Furthermore, the embodiment presumes that the zone will actually occur at the presumed zone center. Although some correction is had by measuring the longest chord crossing the vertical through the presumed center, rather than taking the vertical line itself as the diameter, still erroneous results might be obtained where the shift in actual zone center is very great.

Figure 8:
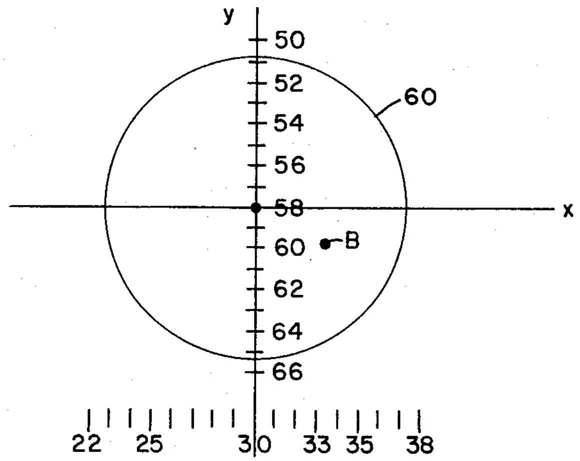
FIG. 8 shows one zone to be measured and is useful in explanation of a third embodiment of the invention.
Figure 9:
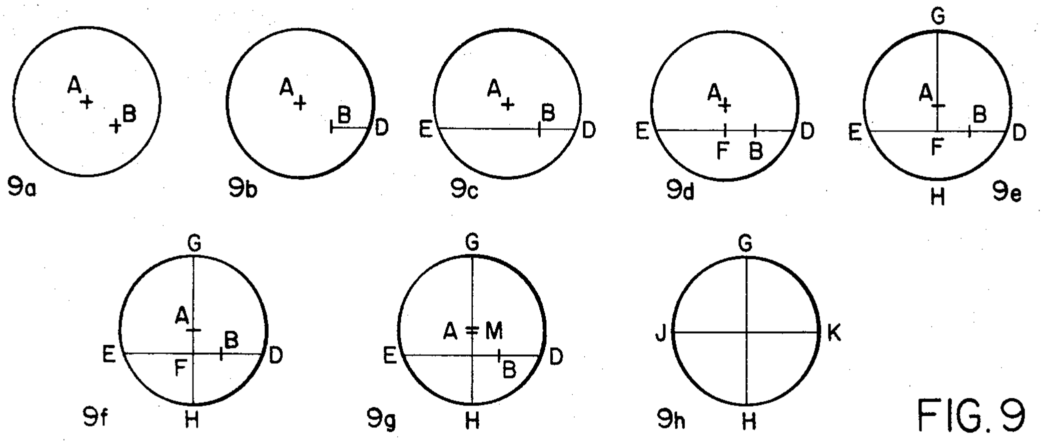
FIGS. 9A through 9H show various stages of operation in connection with the method of operation of a third embodiment of this invention.
Figure 10:
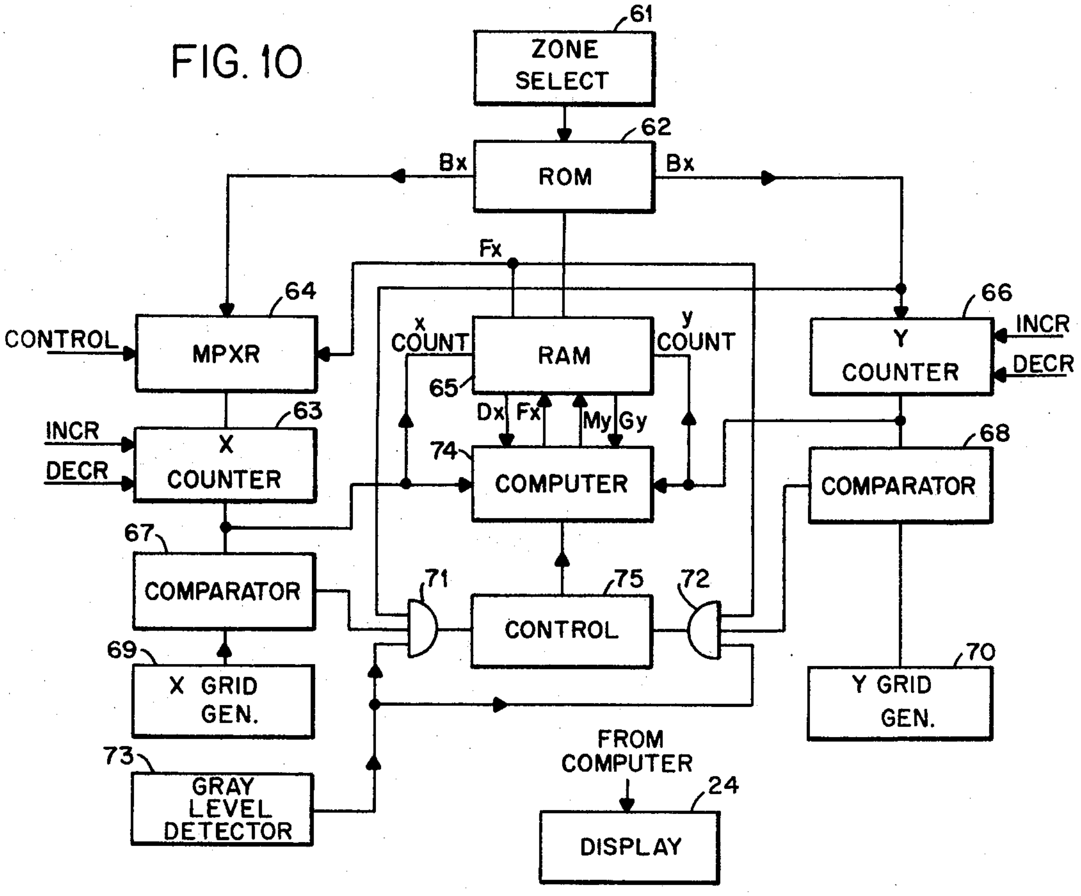
FIG. 10 shows an apparatus useful in carrying out a third embodiment of this invention.

A further embodiment for carrying out the present invention is shown with respect to FIGS. 8 through 10, and is referred to as the "expanding cross" method. This method is especially useful where there is imprecise placement of the antibiotic cylinders or discs and the actual zone diameter is displaced from the presumed zone center.

FIG. 8 shows a zone having a perimeter 60 superimposed on a grid system, as was previously discussed with regard to FIGS. 6 and 7. Due to an error in placement of the antibiotic reservoir the actual zone center at A ($x$=30, $y$= 58) is displaced from the presumed zone center at B ($x$=33, $y$=61). FIG. 9 shows the steps taken to determine the actual zone center A from the presumed center B (FIG. 9A). A horizontal line is first incrementally expanded from B to the right until it intersects the zone edge at point D, as shown in FIG. 9B. This line is then incrementally expanded from B to the left until it likewise intersects the zone at the opposite side, at point E, as shown in FIG.9C. In FIG. 9D, line ED is bisected to produce point F. From F a vertical line is incrementally expanded until it intersects the perimeter at G, as shown in 9E. Line FG is noted to pass through the actual zone center A since under geometric principles, the perpendicular to a bisected chord passes through the center of a circle. Another vertical line is expanded from point F downward until it intercepts the zone at H, as shown in FIG.9F. The chord GH is then bisected to produce point M as shown in FIG.9G. Point M will be at or very near to the actual center at A. A horizontal is then expanded to the right and to the left from point M until it intersects the perimeter of the circle at points J and K, as shown in 9H. The length JK is a very good approximation to the zone diameter.

If a better center than M is required, point M may be used as a new trial center and the above steps 9A through 9H are repeated to obtain a new M' which would be even closer to the point A.

A particular apparatus for carrying out the method described with respect to FIGS. 9A through 9H is shown in FIG. 10. It is to be noted that FIG. 10 describes only the particular hardware necessary for locating the actual zone center. The scanning equipment as shown in FIG. 5 would be added for a complete system. Specifically, from FIG. 5 a scanning device would be needed which would be synchronized by a synchronizing generator, which also operates a grid generator. The output from the scanning device is digitized by a grey level comparator.

Referring now to FIG. 10, zone selector 61 is used to select the particular zone to be measured. The presumed center coordinates are contained in the read only memory (ROM) 62. When addressed, it will put out $B_x$ and $B_y$, the coordinates of the presumed center. The x counter 63 can be loaded with either $B_x$ or $F_x$ (the $x$ coordinate of the point F shown in FIG.9), through the multiplex unit 64, and can also be incremented or decremented under proper control. The random access memory (RAM) 65 serves as an intermediate accumulator and stores computations as well as the contents of either the $x$ or the $y$ counters. The y counter 66 can be incremented, decremented or parallel loaded with the $B_y$ output from the read only memory 62. Comparators 67 and 68 compare, respectively, the $x$ and $y$ counters with the grid position derived from the $x$ and $y$ grid generators shown at 69 and 70, respectively. The comparators 67, 68 will put out a pulse whenever the $x$ and $y$ counters equal the value of the grid position of the scanning beam.

Gates 71 and 72 are used to determine whether a given $x$ or $y$ line has intercepted the growth area. The gates will pass a signal only when there exists simultaneously a value on the gray level detector; the values of $B_y$ (or $F_x$) and the $x$ count (or $y$ count). Thus, the value of the $x$ count and the value $B_y$ must be present at the same point as the value of the gray level detector. Similarly, the $y$ count and the value $Fx$ must be coincident with an output from the gray level detector, in order to indicate an interruption with the zone perimeter. The gray level detector is shown at 73. A computer 74 is used to determine the bisection points of the chords as well as the total length of the diameter. The control element 75 provides the essential control for all of the operations. The output representing the computer diameter as calculated by computer 74 is ultimately displayed on output display unit 24.

In operation, the value of $B_x$ representing the $x$ coordinate of the presumed center is read out from the ROM 62 and loaded into the $x$ counter 63 through the multiplex 64. The $x$ counter 63 is incremented by one, thereby extending a line from B to the right. The new value of the $x$ coordinate in conjunction with the $y$ coordinate, $B_y$ is checked against the growth perimeter from the gray level detector by means of gate 71, to determine if the line has intercepted the perimeter. If no intercept has yet occurred the $x$ counter 63 is again incremented and the checking continues until such time as an intercept has occurred at which time the value of $B_x$ has been determined and is stored in the RAM 65. The $x$ counter is again loaded with the value $B_x$ and is decremented. A respective process of decrementing the $x$ counter followed by checking against the growth perimeter is again gone through until the decremented $x$ value indicates an intercept with the growth perimeter at which point the value of $E_x$ is determined. When the value of $E_x$ is determined, the computer 74 calculates the values of $F_x$, representing the bisected line DE and the value $F_x$ is stored in the RAM 65.

The $y$ counter 66 is then loaded with the value $B_y$ and initially incremented until the value in the $y$ counter, in conjunction with the value $F_x$, indicates an interception with the growth perimeter, at which time the value of $y$ represents $G_y$ and is stored in the RAM 65. The value $B_y$ is again loaded into the $y$ counter 66 and this time decremented until the value of the $y$ counter in conjunction with the value $F_x$ again intersects the growth perimeter at which time the value $H_y$ is determined. The computer then bisects the line GH to determine the location of the point M.

The $x$ counter 63 is then loaded with the value $F_x$ and is again first incremented and then decremented until there exists coincidence between the x count, the value $M_y$ and the growth perimeter. This provides the points J and K. The computer then calculates the total distance between J and K, and the output displays this value as the diameter.

While the above described "expanding cross" embodiment is satisfactory for numerous applications of zone measurement, it essentially measures diameters and the total area must be calculated therefrom, assuming an approximate circular shape. However, should the zone perimeter contain finger-like protrusions at various locations, and should the diameter be measured at the occurrence of such protrusion, erroneous results would occur which will provide misleading area calculations.

In addition, all of the above identified discussed embodiments, while generally relating to the overall generic concept of zone area measurements as described herein, are generally effective for continuous and well-defined zone edges. However, sometimes zones can overlap, run out, and have numerous broken edges resulting from streaking or inaccurate application of the microbiological growth. These were described in connection with FIG. 2 and particularly the zone indicated therein by the numeral 18.

A further embodiment for carrying out the general method of the present invention, where, especially, the edges are broken, is shown by the FIGS. 11 through 14 and is referred to as the "expanding geometric shape" method. As shown in FIG. 11A, a zone with an assumed center at point A, whose coordinates are represented by $x$ and $y$, has a generally circular shape 76 with breaks in the continuity of the perimeter, shown at 77, 78, 79 and 80. FIG. 11B shows the identical zone with a circle 81 generated within the zone and concentric therewith by having the same center A as the zone itself. Points at which the generated circle 81 contact the perimeter of the growth region 76 are called coincident points and may occur anywhere on the perimeter of the zone. It is apparent that in FIG. 11B no such conicident points exist. The diameter of the generated circle 81 is then incremented by a fixed amount and is again tested for coincident points with the zone perimeter. The process is repeated until a given number of coincident points is detected at which time the incrementing process is stopped. The diameter of finally generated circle is a good approximation of the zone diameter and the area of the circle generated is also a good approximation of the area of the zone to be measured.

Figure 11A:
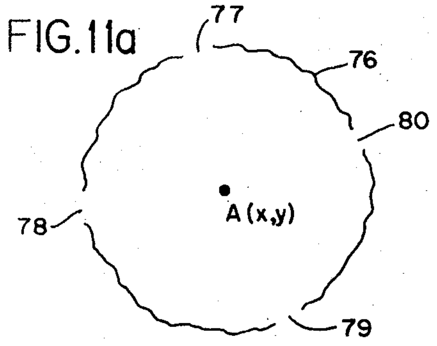
FIGS. 11A through 11C are diagrams of a zone to be measured and explains the operation of a fourth embodiment of this invention.
Figure 11B:
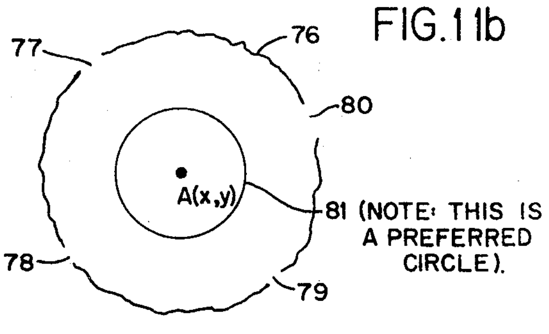
Figure 11C:
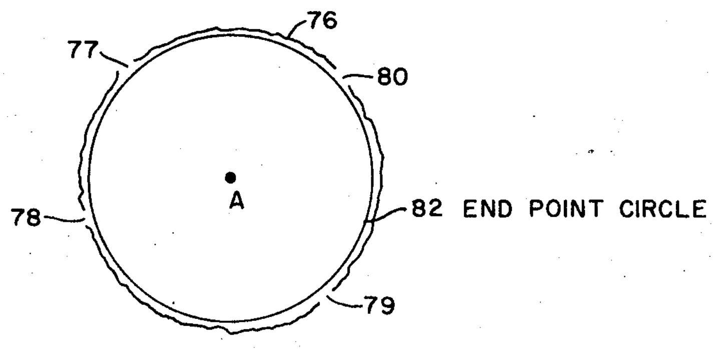

A typical end point circle for the zone shown in FIGS. 11A and 11B can be seen in FIG.11C wherein end point circle 82 is shown coincident with the zone perimeter 76 at various points. It is to be noted that the breaks 77, 78 79 and 80 in the zone perimeter did not affect the process. The size of the end point circle 82 will be related to the number of coincident points required to stop the incrementing process. The fit of the end point circle to the actual zone can be adjusted by varying the number of coincident point criteria. A larger number of concident points required will result generally in a larger diameter.

A variation in this method would be to use an initial trial circle that is larger than the largest permissible or possible zone, and to decrement the circle until the number of coincident points drops below some preset number. This could avoid errors in end point decisions caused by the presence of antibiotic cylinders or discs at the center of the zone.

Generally, the resolution and accuracy obtained in the end point circle diameter will be determined by the size of the circle increments as well as the criteria for the number of coincident points in determining the end point circle. If very small increments are used, the end point circle will approach the actual zone size more closely. However, the rate at which zones can be measured will be adversely affected by these smaller increments. In such cases it would be possible to use a coarse increment scale followed by a fine increment scale whereby a first order trial circle slightly larger than the zone could be determined and then a second order final circle would be determined by decrementing to provide a better fit for the actual zone.

Although this embodiment was described with relation to generating a circle, it is understood that this embodiment is not limited to expanding or contracting circular shapes but relates to any geometric shape as, for example, squares, triangles, hexagons, starbursts, spirals, and so forth. The description is given in terms of circles merely because it is easier to visualize and may be more optimum for circular type zones. However, other types and shape of zones may require other types of geometric shapes to determine the size of the zone. Furthermore, it may in fact be less expensive to generate other types of expanding geometric shapes than to generate the expanding circle.

Assuming by way of example that the expanding geometric shape is a circle, such expanding circular shape could be generated in various ways dependent primarily upon the type of scanning element used. In the case where the scanning means is a cathode ray rube flying spot scanner, circles are easier to generate than most other shapes. The familiar Lissajous figures produced by applying sine and cosine functions to the horizontal and vertical deflection system of the cathode ray tube would produce a circle that could easily be altered in size and position by changing the amplitude of the AC and DC components of the deflection signals. A block diagram for such a system is shown in FIG. 12.

Figure 12:
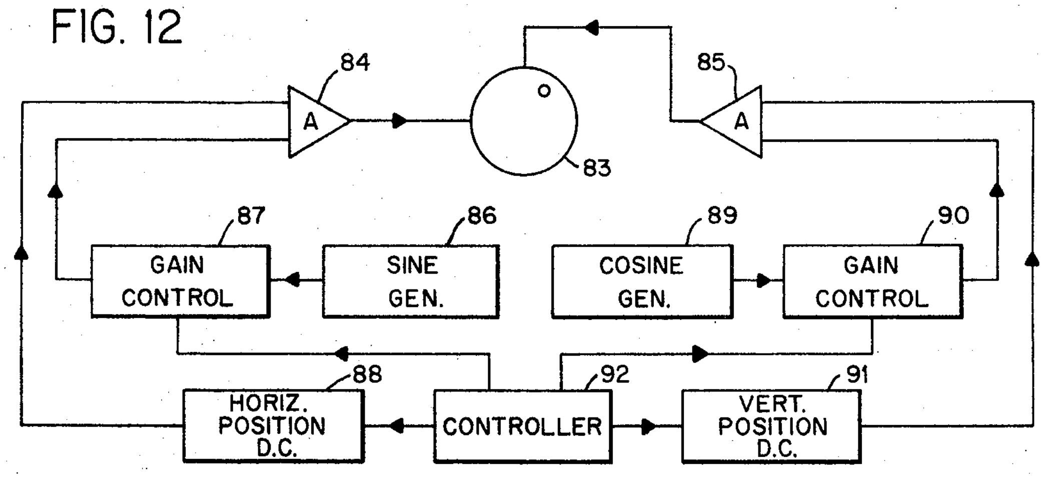
FIG. 12 shows one method of generating an expanding circle in connection with a fourth embodiment of this invention.

In FIG. 12 a flying spot cathode ray tube is shown at 83 whose horizontal and vertical inputs are controlled respectively by the outputs from summing amplifiers 84 and 85. Amplifier 84 is used to add the AC component from the sine generator 86 whose output is controlled by gain control 87, to the DC component from horizontal position DC circuitry 88. In a similar manner the summing amplifier 85 adds the AC component from cosine generator 89 through gain control 90, to the vertical position DC value generated at 91. A control element 92 operates to implement the increment or decrement position functions required to expand or contract the generated circular shape.

In the case where a scanning device uses a moving mirror system a similar block diagram would be used to implement the process. The moving mirror system might be advantageous because a light source of varying intensity and color could be used in specific cases where signal to noise ratio could be enhanced. For example, it may be found that certain culture media transmit very small amounts of light in the growth area when monochromatic light of a specific wavelength is used.

In a raster scan system wherein the scanning means is generally a television camera the circle type of geometric shape would be more difficult to generate. The horizontal components which determine the circle periphery would be a number of raster line segments beginning at the top of the circle with a zero length value and becoming proportionately longer until the center is reached which is the maximum length and then again diminishing proportionally to zero at the bottom of the circle. The vertical dimension of the circle would be dependent upon the number of raster line segments comprising the circle in the vertical direction. These two parameters have to be under proportional control to preserve the roundness of the circle as it expands.

Figure 13:
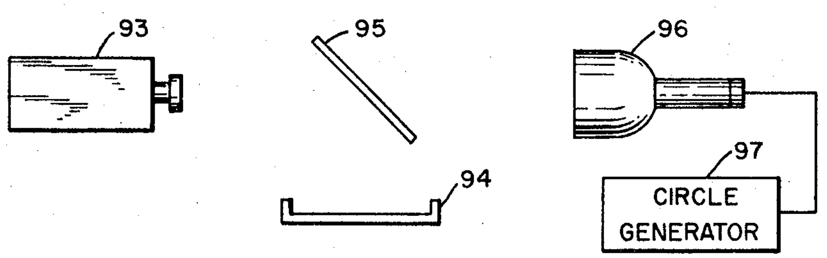
FIG. 13 shows one apparatus for carrying out a fourth embodiment of this invention.
Figure 14:
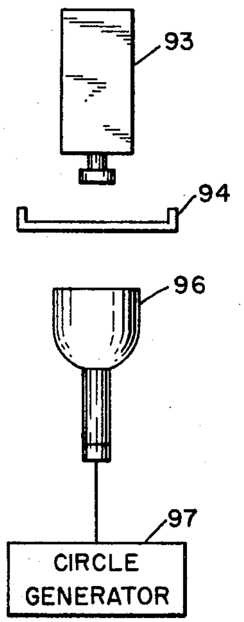
FIG. 14 shows another apparatus for carrying out a fourth embodiment of this invention.

Generally, the raster scan television camera is easier to use for digitizing the gray scale information of the growth area and zone of inhibition. On the other hand, a circle is more difficult to generate using the raster scan system. The flying spot cathode ray tube, while generating a circle with ease, provides more difficulty in digitizing the zone of inhibition perimeter. Accordingly, a composite type system is beneficial in which the scanning device is a raster scan element while the circle generating device is a flying spot cathode ray tube. This would allow the use of the television monitor to view the dish and digitize the shape viewed, while the flying spot scanner generates the expanding circle. FIGS. 13 and 14 show two possibilities for using a composite type of system. In FIG. 13 a television camera is shown at 93 which views the dish 94 through a beam splitting mirror 95. A cathode ray flying spot tube 96 controlled by a circle generating system 97 is placed axially with the television camera, and on the other side of the beam splitter 95. As a result, the television camera 93 views a composite picture comprising both the zones in the dish 94 as well as the circles generated by the cathode ray tube 96.

FIG. 14 shows a variation on the general composite scheme shown in FIG. 13 wherein like parts are identified by like numerals. In FIG. 14 the beam splitter is omitted by placing the cathode ray tube 96 axially with the television camera and placing the dish 94 directly in the path between the axial connection. As a result, again the television camera 93 views the composite picture. However, in FIG. 14, the dish 94 must be of a translucent material. Furthermore, the agar medium must be such that it will pass the light from the cathode ray tube.

Figure 15A:
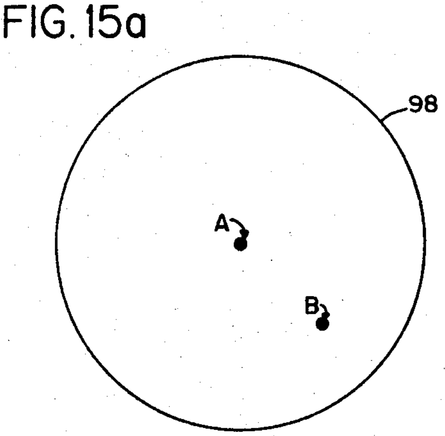
FIGS. 15A and 15B show a specific zone to be measured and is useful in connection with explaining a variation in the fourth embodiment of this invention.
Figure 15B:
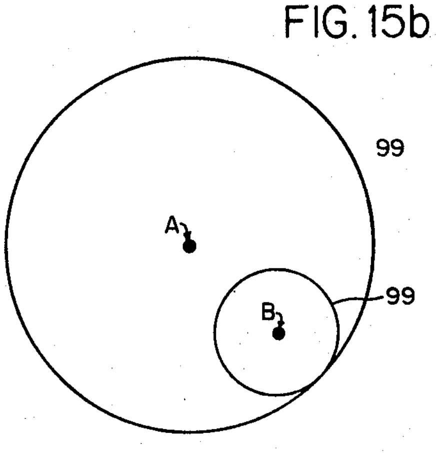

While the expanding geometric shape method will provide diameter and area measurement despite breaks in the periphery of the zone, this embodiment must be further adapted to correct for errors in the location of the zone. Thus, although a particular zone center is presumed, in fact, the actual zone center may vary in spatial location from the presumed center. When generating the expanding shape, if the circle is not at the actual center, erroneous results could be obtained. For example, referring to FIG. 15, there is shown an approximately circular zone of inhibition 98, having an actual geometric center at point A with a presumed center at point B. The presumed center is read from a stored table of coordinates which specify the expected center of the zone as a function of the location on the agar medium in the dish. If the expanding shape method previously described were used with point B as the center, a substantial error would result as shown in FIG. 15B wherein the circle 99 would be determined as the appropriate final point circle since it in fact intersects with the growth area. However, as can be seen, this is an erroneous result.

The expanding geometric shape method can be used therefore not only to determine the appropriate diameter and area of the zone to be measured, but also to determine the actual geometric center of the zone from the presumed center. In this case the method referred to as the "floating geometric shape" method.

Figure 16A:
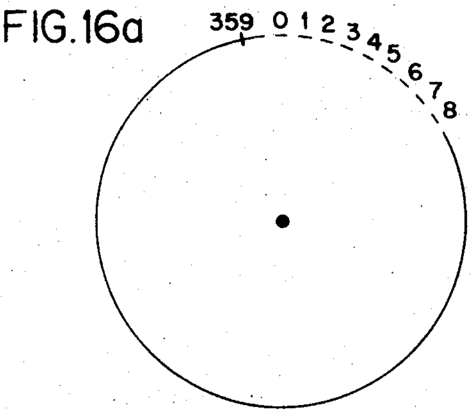
FIGS. 16A through 16D represents diagrams useful in explaining the variation in the fourth embodiment of this invention.
Figure 16B:
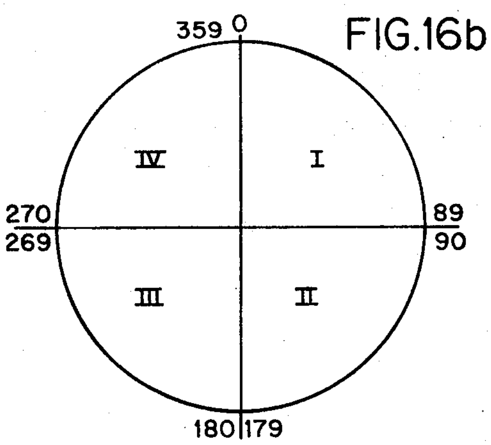

The theory behind the method is shown with reference to FIGS. 16A through 16D. As seen in FIG. 16A, it is assumed that each trial circle generated has its periphery divided into 360 segments called test segments and numbered clockwise from zero to 359. Some of the initial segments are shown in FIG. 16A. The circle is further divided into quadrants as shown in FIG.16B labeled I, II, III and IV. The first quadrant contains the segments 0 through 89; quadrant II contain the segments 90 to 179; quadrant III contains the segments 180 to 269 and quadrant IV contains the segment 270 to 359.

Figure 16C:
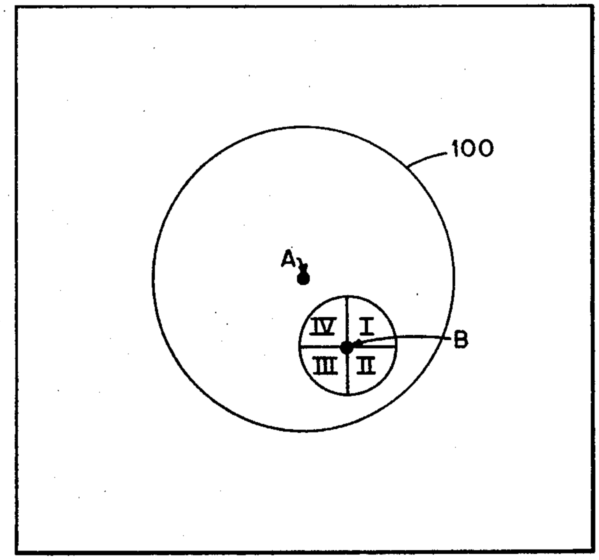
Figure 16D:
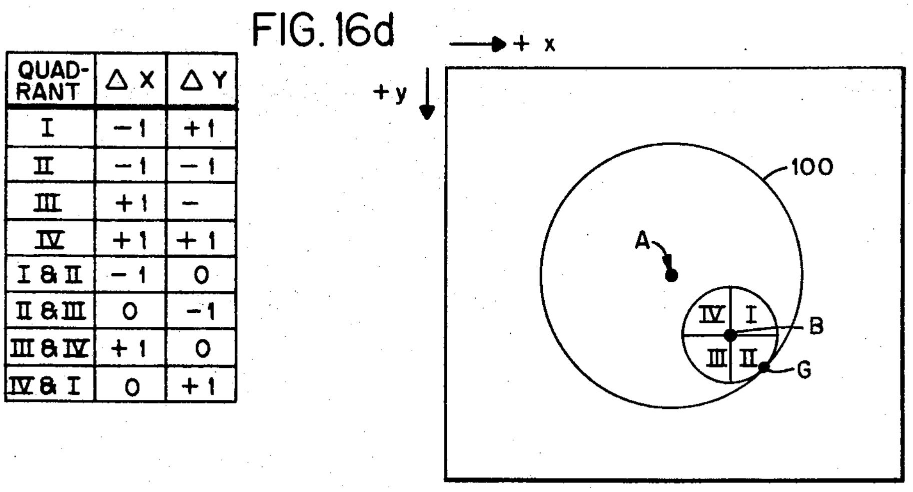

FIG. 16C shows a zone 100 whose geometric center is at point A and whose presumed center is at point B. Since the coordinate location of the point B is known, the geometric circular shape is generated using B as the center. The circle is then incementally expanded about the presumed center at B until it intersects the zone at point G as shown in FIG. 16D. When an intersection occurs, it is coordinated with the quadrant of the generated circle. In FIG. 16D the point G occurs in quadrant II. Based upon which quadrant, or quadrants, the point, or points, of coincidence occur, the center is then shifted incrementally in accordance with table 1 and the entire circle generating and expanding is again repeated, this time from the new trial center. When an intersection is again noted, and the associated quadrant of intersection of the circle determined, the trial center is again shifted in accordance with table I. The process continues until an end point circle is generated wherein a predetermined number of coincident points of intersection occur spread throughout the various qudrants thereby indicating that the trial circle is now at the approximate geometric center of the actual zone.

The truth table in FIG. 16D is understood as shifting the trial center in an opposite direction to the point of intersection. Namely, when a point of intersection occurs in quadrant I the center is shifted to the left in the $-x$ direction and is shifted downward in the $+y$ direction. The $x$ and $y$ directions are shown in FIG. 16D. Intercepts in two quadrants, for example quadrants I and II, would cause translation of the trial center to the left in the $-x$ direction only.

Figure 17:
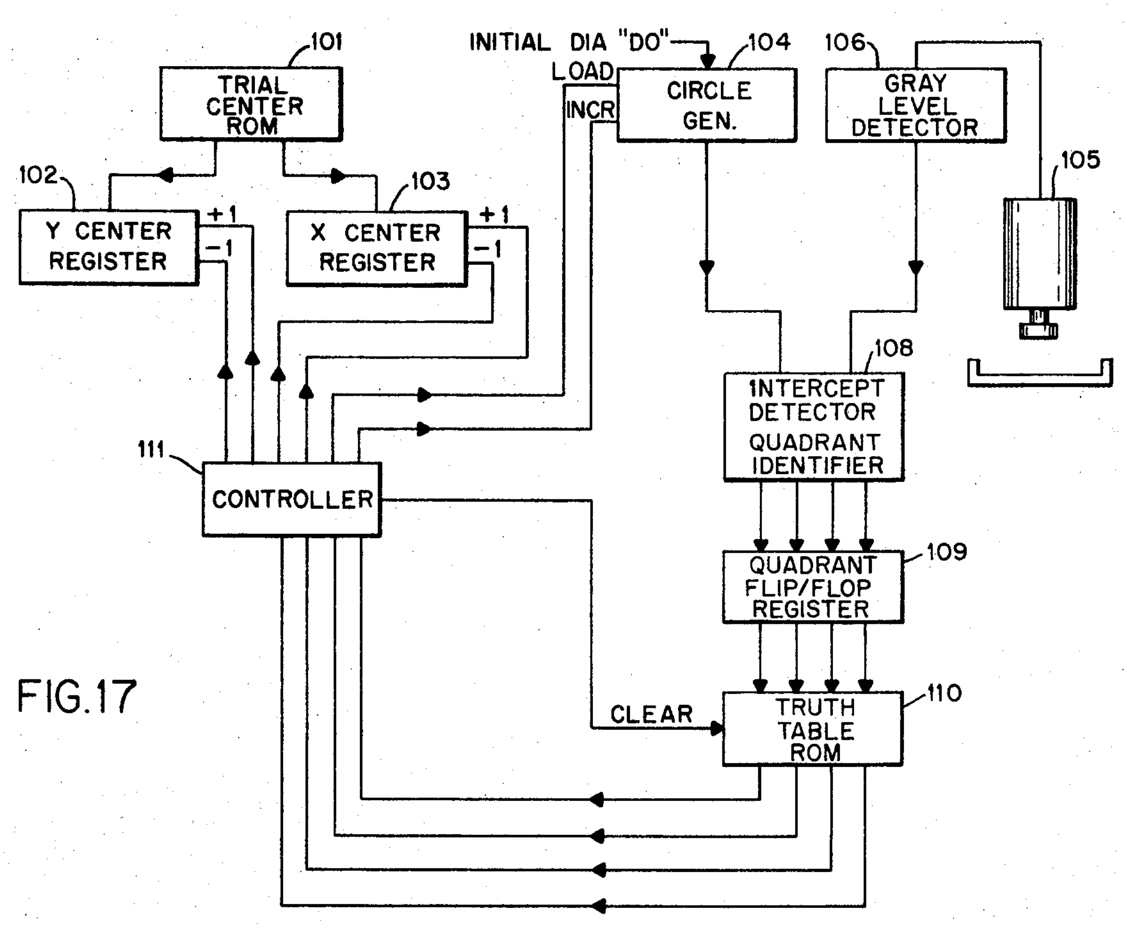
FIG. 17 shows an apparatus for carrying out the variation in the fourth embodiment of the invention.

A block diagram for the implementation of the floating geometric shape method heretofore described is shown with reference to FIG. 17. A read only memory 101 is used to store the presumed centers. Register 102 serves as the temporary $y$ center register and register 103 serves as the temporary $x$ center register. These registers can be parallel loaded from the read only memory 101 or incremented and decremented under proper control by controller 111. 104 is a circle generating element which can receive a parallel loaded initial diameter Do, or be incremented or decremented under proper control from controller 111. The scanning element 105 and gray level detector 106 are similar to those heretofore described for viewing the dish 107. An intercept detector and intercept quadrant identifier element 108 has two inputs; one from the circle generator 104 and one from the gray level detector 106, and has four outputs each identifying one of the four quadrants which in turn feed the quadrant flip-flop register 109. A truth table read only memory 110 contains the information from table 1 and this element receives the intercept quadrant data from the flip-flop register 109 and provides one of the four outputs relating to plus or minus $x$ and plus or minus $y$ as read from the truth table. The output from the truth table ROM 110 goes to a controller 111 which accordingly instructs the $x$ center register 103 and $y$ center register 102 to increment or decrement its value and thereby shift the trial center closer to the true geometric center of the zone of inhibition.

In operation, the presumed centers are loaded from the trial center ROM 101 into the $x$ and $y$ center registers 103 and 102 respectively. An initial diameter circle Do is generated by circle generator 104. The circle is tested in the element 108 to determine if any intercept with the growth from the gray level detector 106 has occurred. Should no intercept be detected, the controller instructs the circle generator to increment the circle. This process continues until an intercept is detected by element 108 at which time the specific quadrant is identified and based upon the truth table in stored memory 110, the controller 111 instructs the $x$ center register and $y$ center register 103, 102 to increment or decrement its values. The circle generator then again generates an initial diameter circle D$o$ at the new location of the trial center and the entire process continues. The process ends when a predetermined number of coincident points spread throughout the circle generated has been detected.

Various end point criteria can be established, as, for example, requiring a number of coincident points in each of two quadrants or a fixed number of coincident points occurring anywhere on the circle. The actual criteria will depend upon empirical evaluation for particular zones to be measured.

What has heretofore been described is a specific method of reading and measuring the size of a pattern. Specifically, the patterns described have been zones of inhibition in antibiotic measurement systems. In such systems the location of the zones are presumably known in advance and the particular size of each individual zone must be determined and identified independently of all other zones. In the method described, the information on the agar medium is first scanned and digitized through a gray level detector into black and white areas to specifically display the entire pattern formed on the agar medium. In one embodiment, referred to as the "area method," the medium is divided into pie-shaped sector elements and the particular zone area per sector is determined. In a further embodiment referred to as the "longest chord method" a vertical line is generated at the presumed center of the zone of inhibition and the longest chord perpendicularly crossing this vertical line segment is presumed as the diameter of the zone of inhibition. The area can then be calculated using standard mathematical calculations. In yet a further embodiment referred to as the "expanding cross method" a chord is generated from the presumed center of the zone of inhibition which extends horizontally until it intersects the growth element. This chord is then perpendicularly bisected by a vertical line which itself is then bisected to determine the actual center. The diameter is then measured from this center. This method compensates for shifting errors of the actual geometric center of the zone of inhibition from the presumed center of the zone. In yet a further embodiment referred to as the "expanding geometric shape method" a geometric shape of specified size is generated and coincident points between the generated shape and the growth zone are determined. Should no coincident points exist, the geometric shape is expanded and again tested. This process is repeated until a fixed number of coincident points are determined. In a modification of this last embodiment to compensate for a shift in the actual geometric center of the zone from the presumed center, a floating type of geometric shape is used, wherein the expanded geometric shape is first carried out at the presumed center and this center is then shifted based upon the detected point of coincident until the actual center is determined. The expanding geometric shape method is then carried out as heretofore described.

Heretofore there has been described a number of alternative methods for measuring the diameters of antibiotic zones of inhibition.

A problem arises when (1) a sensitivity disc 158 is used as the source for the antibiotic and (2) the resulting zone of inhibition has a diameter just slightly larger than the disc 158.

The problem and its solution will be described in terms of a system shown in FIG. 17 in which the scanning means is a television camera 152 that "sees" reflected light from the surface of the petri dish 154 during the zone measuring process.

The employment of other types of optical difference detectors such as scanning elements or transmitivity detectors (i.e., density rather than reflectivity) for measurement of growth is envisioned. These could be implemented by conventional hardware modifications that would not alter the center-finding algorithm which is the subject of this disclosure.

Figure 18:
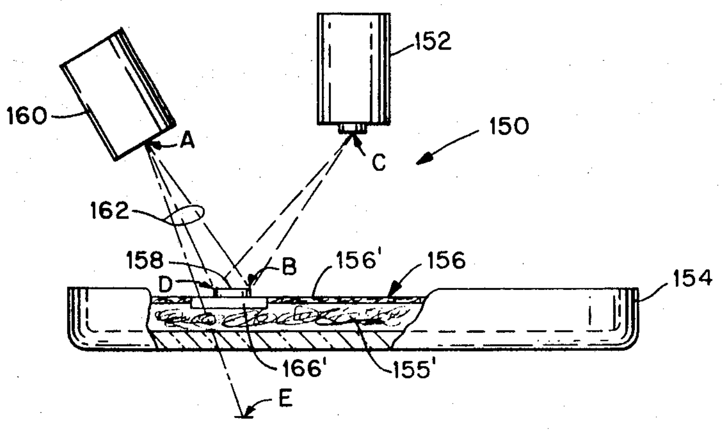
FIG. 18 is a schematic showing of a scanning system with a Petri dish shown partially broken away.
Figure 19:
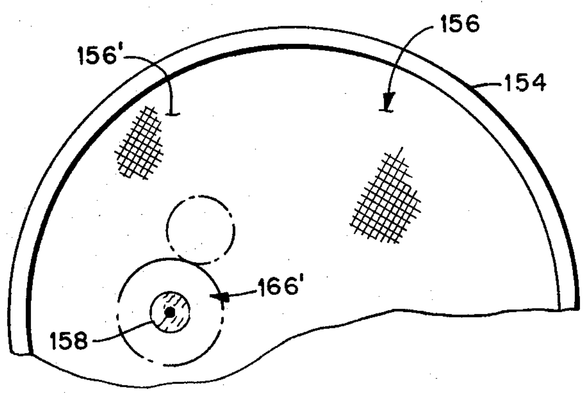
FIG. 19 is a plan view of the Petri dish of FIG. 18 partially broken away.

FIG. 18 shows the scanning situation described. Television camera 152 is focused on a petri dish 154 which contains agar 155 having uninhibited organism growth 156 on its surface designated by the dark shading 156'. An illuminating source 160 supplies a cone of rays 162 emanating from point (A) toward the dish. The growth region 166 and the disc 158 have nearly the same reflectivity and will therefore appear "white" to the camera. The reflected rays are shown at ABC and ADC, respectively. Ray AE passes through the agar in the region of "no growth" 166' (the zone of inhibition) and is not reflected. The zone, therefore, appears "black" to the camera. The camera's view of the zone is shown in FIG. 19.

One system disclosed employs an algorithm for finding the diameter of a zone of inhibition by means of an expanding geometric shape with a "floating" center. The end-point circle in this system is determined by counting the number of co-incident points between the growth and the generated circle.

Figure 19A:
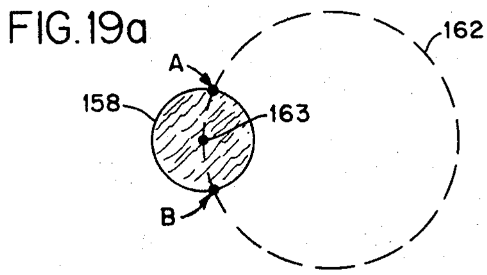
FIGS. 19A through 19C are diagrammatic showings of sensitivity discs in relation to scanning circles.

In order to measure small zones accurately, the initial "trial circle" 162 must fall just outside the disc 158. If the initial trial circle 162 is not concentric with the disc 158, the situation shown in FIG. 19a will result.

Note that the trial circle intercepts the disc along arc AB. It was shown that both the disc and growth appear "white" when the dish is illuminated from above. A number of valid coincident points will therefore be found along AB. If the number exceeds the criterion for the end point circle, the apparatus will "think" it has found the diameter of the zone of inhibition. It is apparent that the greater the eccentricity between the disc 158 and the initial trial circle 162, the worse the problem will become. For a given tolerance in the location of the initial trial circle center 163, the problem can be "solved" by increasing the diameter of the initial trial circle 162.

Figure 19B:
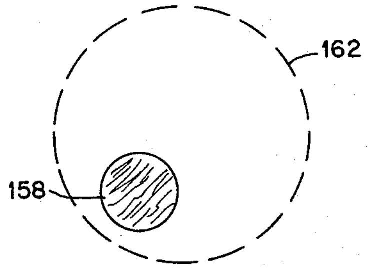

This is shown in FIG. 19*b*, in which the trial circle 162 no longer intercepts the disc 158. This "solution" however creates a new problem when the zone of inhibition is small.

Figure 19C:
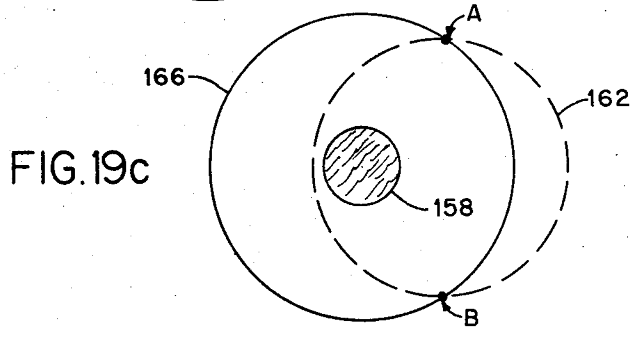

Because the zone is approximately concentric with the disc 158, the initial trial circle 162 is also eccentric with the zone. If the zone is small, the initial trial circle 162 can overlap the growth sufficiently to produce the end-point criterion. This is shown in FIG. 19*c* along arc AB.

The following discloses a system of operations that provides solutions to both of the problems discussed above. It will provide an initial trial circle 162 concentric with, and just slightly larger than, the disc 158.

Imagine the dish 154 of FIG. 18 illuminated from below. Light will be transmitted through all portions of the dish except the discs 158. The camera will see a white field with (relatively) black discs in it. The disc 158 drop pattern can be specified with a tolerance that will guarantee that each disc is within a specified distance of its nominal (expected) position. If this distance is chosen as three times the disc diameter, then any disc can be found within an acceptance circle having a diameter equal to 3X the disc diameter and a center located at the nominal disc center.

Thereafter the floating geometric shape algorithm is used to find the disc center by employing the collapsing circle and adjusting the trial circle center until end-point criterion are met.

The term "grey level" as employed in the claims is intended to encompass differences in optical response between areas whether determined by transmission or reflection techniques.

What I claim as new and desire to secure by Letters Patent is:

1. In a field having a plurality of zones at presumed spatial locations within the field, the zones having a generally different grey level than the surrounding field, a method for automatically measuring the size of a particular selected zone comprising the steps of:

a. scanning the field to produce an electrical output signal as a function of the grey level of the field scanned;
b. quantizing the output signal into a binary pulse signal, one level representing the presence of a zone and the other level representing the surrounding field;
c. synchronizing the scanning to coordinate each particular location being scanned with its corresponding quantized binary signal level thereby forming a digitized picture of the field;
d. selecting a particular presumed location of a given zone;
e. counting the number of pulses of the one level at the presumed location; and
f. displaying the number counted.

2. A method as in claim 1 wherein said step of selecting further comprises the steps of:

a. dividing the field into sectors such that each sector presumably contains one zone; and
b. choosing a specified sector.

3. A method as in claim 1 wherein the step of selecting further comprises the steps of:

a. generating a grid coordinate system superimposed on the scanned field;
b. storing the presumed spatial locations of each zone by its presumed centroid coordinates within the grid system; and
c. electrically generating a vertical line passing through the centroid coordinates of the zone selected and extending until the digitized perimeter of the zone selected, and the step of counting further comprises the steps of:

d. detecting the number of pulses of said one level in a horizontal scanning line which crosses said generated vertical line at its uppermost end;
e. storing said number detected;
f. repeating step (d) for the next subsequent horizontal scanning line;
g. comparing the number detected in step (f) with the number stored and then storing the larger of the two numbers; and
h. repeating the steps (f) and (g) until the horizontal scanning line no longer crosses said vertical generated line.

4. A method as in claim 1 wherein said step of selecting further comprises the steps of:

a. generating a grid coordinate system superimposed on the scanned field;
b. storing the presumed spatial locations of each zone by its presumed centroid coordinates within the grid system;
c. electrically generating a horizontal line passing through the presumed centroid coordinates of the zone selected and extending until the digitized perimeter of the zone selected;
d. electrically bisecting said horizontal line thereby forming a first point;
e. electrically generating a vertical line passing through said first point and extending until the digitized perimeter of the zone selected; and
f. bisecting said vertical line thereby forming a second point, and said step of counting further comprises the steps of:

g. electrically generating a horizontal line through said second point and extending until the digitized perimeter of the zone selected; and
h. detecting the number of pulses of said one level in said last mentioned horizontal line.

5. A method as in claim 1 and wherein the step of selecting further comprises the steps of:

a. generating a grid coordinate system superimposed on the scanned field;
b. storing the presumed spatial location of each zone by its presumed centroid coordinates within the grid system;
c. electrically generating a trial geometric shape using the presumed centroid coordinates of the zone selected as the centroid of the trial shape;
d. detecting the number of coincident points between the trial shape and the digitized perimeter of the zone selected;
e. comparing the number of coincident points with a predetermined fixed number;
f. electrically altering the size of the geometric shape to form a further trial geometric shape concentric with the previous trial geometric shape; and
g. repeating steps (d), (e), and (f), until the number of coincident points equals or exceeds the predetermined fixed number, and the step of counting further includes the steps of:

h. storing the size of the shape which satisfied step (g); and i. determining the number of pulses of said one level comprising the size of said last mentioned shape.

6. A method as in claim 5 further including between steps (c) and (d) the step of:

visually superimposing the generated geometric shape on the field.

7. A method as in claim 5 and wherein said geometric shape is a circle.

8. A method as in claim 5 and including between the steps (c) and (d) the further steps of:

j. testing for the presence of a coincident point between the trial geometric shape and the digitized perimeter of the zone selected;

k. electrically incrementing the size of the trial geometric shape to form another trial geometric shape concentric with the previous trial geometric shape;

l. repeating steps (j) and (k) until at least one coincident point occurs between the trial geometric shape and the digitized perimeter of the zone selected;

m. identifying the position on the trial geometric shape of the coincident points occurring in step (1);

n. shifting the presumed centroid coordinates a fixed amount in an opposing direction to the said position identified on the trial geometric shape;

o. repeating step (c) using the shifted centroid coordinates as the centroid of the trial shape;

p. subsequently repeating steps (j) through (n) until the number of coincident points are spaced throughout the geometric shape;

q. recording the centroid of the geometric shape satisfying (p); and r. generating a geometric shape at the recorded centroid.

9. An apparatus for automatically measuring the size of a particular selected zone from a field having a plurality of such zones spaced at presumed locations within the field, the zones having a different grey level than the surrounding field, comprising:

scanning means to view the field and producing an electrical output signal as a function of the grey level of the field scanned;

quantizing means connected to the output of said scanning means and converting said electrical output signal into a binary pulse signal, one level of which represents the presence of a zone and the other level of which represents the surrounding field;

synchronizing means connected to said scanning means for controlling the position of the field being scanned thereby coordinating each particular location being scanned with its corresponding binary signal level from the quantizing means whereby a digitized picture of the field can be produced;

selecting means connected to receive inputs from said synchronizing means and said quantizing means for choosing a particular presumed location of a given zone; counting means connected to the output of said selecting means for counting the number of pulses of said one level at the location selected, and display means connected to the output of said counter means to display the number counted.

10. Apparatus as in claim 9 wherein said scanning means is a raster scan device, said quantizing means is a grey level comparator having means to adjust the grey level threshold therein, said synchronizing means includes a synchronizing signal generator and said selecting means includes a clock oscillator in series with gating means.

11. An apparatus as in claim 10 wherein said selecting means further includes sector generating means for dividing the synchronizing signal produced by said synchronizing means into a plurality of adjacent segments such that each segment presumably contains only one zone, and sector selector means for selecting the particular segment containing the zone to be measured while blocking all other sectors.

12. An apparatus as in claim 10 further including grid generating means connected between said clock oscillator and said synchronizing signal generator for generating a grid co-ordinate system superimposed on the scanned field; storage means for retaining the presumed location of each zone by its presumed centroid coordinates within said grid system; vertical line generating means connected to both said storage means and said grey level comparator for generating a vertical line passing through the presumed centroid coordinates of the zone selected and extending until the digitized perimeter of the zone selected; further storage means connected to the outputs from said counting means and said vertical line generating means for storing the number of pulses of the one level produced in each horizontal scan line crossing said generated vertical line; comparison means connected to the output of said counting means and to the output of said further storage means for comparing the number stored in said further storage means with the new number contained in said counting means representing the number of pulses of said one level in the subsequent horizontal scanning line and retaining the larger of the two numbers, and additional storage means for storing the output of said comparison means.

13. An apparatus as in claim 10 further comprising grid generating means connected between said clock oscillator and said synchronizing signal generator for generating a grid coordinate system superimposed on the scanned field; storage means for retaining the presumed location of each zone by its presumed centroid coordinates within said grid system; horizontal line generating means connected to the output of said storage means and said grey level comparator for producing a line passing through the presumed centroid coordinates of the zone selected and extending until the digitized perimeter of the zone selected; computer means connected to the output of said horizontal line generating means for calculating the mid-point of the horizontal line generated; and vertical line generating means connected to said computer means and said horizontal line generating means for producing a vertical line passing through the mid-point of said horizontal line generated and extending until the digitized perimeter of the zone selected, said computer being further connected to the output of said vertical line generating means whereby the midpoint of said vertical line generated can also be determined.

14. An apparatus as in claim 10 further comprising grid generating means connected between said clock oscillator and said synchronizing signal generator for generating a grid coordinate system superimposed on the scanned field; storage means for retaining the presumed location of each zone by its presumed centroid coordinates within the grid system; and geometric shape generating means connected to said storage means and capable of generating a plurality of concentric geometric shapes in index increments about the centroid coordinates stored in said storage means.

15. Apparatus as in claim 14 wherein said geometric shape generating means is a circle generator comprising a cathode ray tube having vertical and horizontal deflection plates, first and second amplifying means each having two inputs and one output, the outputs connected respectively to said vertical and horizontal deflection plates, first and second DC position control means, each connected respectively to one of the inputs of said first and second amplifying means, sine and co-sine generating means each connected respectively to a second one of the inputs of said first and second amplifying means, and control means connected to and controlling said DC position means and said sine and cosine generator means.

16. An apparatus as in claim 14 and further comprising an optical beam splitter wherein said scanning means and said geometric shape generating means are axially spaced with said beam splitter interposed therebetween and said field being scanned is orthogonally placed with respect to said axial position at the position of said beam splitter.

17. An apparatus as in claim 14 wherein said scanning means and said geometric shape generating means are axially spaced and said field being scanned is interposed therebetween, said field capable of passing light therethrough.

18. An apparatus as in claim 9 further comprising storage means for retaining the presumed locations of each zone by its presumed centroid coordinates within a grid coordinate system superimposed on said scanned field; first and second shift registers connected to the output of said storage means; geometric shape generating means connected to said storage means and capable of generating a plurality of concentric geometric shapes in indexed increments around the centroid coordinates stored; detector means connected to the outputs of said geometric shape generating means and said quantizing means for detecting the coincidence of points between the geometric shape generated and the digitized perimeter of the zone selected and identifying the position on said geometric shape wherein said coincident points occur; computer means connected to the output of said detector means for calculating a fixed amount of shift in centroid coordinate position in opposition to the position on said geometric shape, the output of said computer means connected to said first and second shift register means for shifting the registers by said fixed amount, and output means connected to said computer means for producing an output at the occurrence of a fixed number of coincident points.

* * * * *